(12) United States Patent
Yokotani et al.

(10) Patent No.: US 6,870,365 B1
(45) Date of Patent: Mar. 22, 2005

(54) ROTATION DETECTING DEVICE

(75) Inventors: Masahiro Yokotani, Tokyo (JP); Izuru Shinjo, Tokyo (JP); Naoki Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/820,753

(22) Filed: Apr. 9, 2004

(30) Foreign Application Priority Data

Nov. 26, 2003 (JP) .................................. P2003-395861

(51) Int. Cl.[7] ................................................ G01B 7/30
(52) U.S. Cl. ......................... 324/207.25; 324/207.19; 324/207.21
(58) Field of Search .......... 324/207.13, 207.15–207.19, 324/207.21, 207.22, 207.23, 207.25, 163; 340/672

(56) References Cited

U.S. PATENT DOCUMENTS 5,644,851 A * 7/1997 Blank et al. .................. 33/361
6,456,063 B1 * 9/2002 Moreno et al. ........ 324/207.12
6,630,821 B2 10/2003 Shinjo et al.

* cited by examiner

*Primary Examiner*—Bot LeDynh
(74) *Attorney, Agent, or Firm*—Sughrue Mion, PLLC (57) ABSTRACT

Six magneto-resistance segments are formed by film-forming on a signal processing circuit part consisting of an IC chip and are disposed in a predetermined rotation direction of a magnetic moving body, symmetrically about the centerline of a magnet perpendicular to that rotation direction. Two pairs of magneto-resistance segments, whose pitch centers are positioned symmetrically with respect to the centerline of the magnet, form first and second bridge circuits, and the remaining pair of magneto-resistance segments, which has its pitch center on the centerline of the magnet, forms a third bridge circuit.

8 Claims, 10 Drawing Sheets

ROTATION DETECTING DEVICE

BACKGROUND OF THE INVENTION

1. Field of the Invention

This invention relates to a rotation detecting device for sensing a rotation direction using a magneto-electric converter device.

2. Description of the Related Art

As shown in Patent Document 1, a rotation detecting device of related art using a magneto-electric converter device has a magnetic moving body shaped to cause changes in a magnetic field, a magnet disposed facing the magnetic moving body and magnetized in the rotational axis direction of the magnetic moving body, and a processing circuit part with four magneto-resistance segments constructed integrally and disposed with a predetermined spacing in the rotational axis direction of the magnetic moving body. A pair of magneto-resistance segments adjacent in the rotation direction of the magnetic moving body form a first bridge circuit, and another pair of magneto-resistance segments adjacent in the rotation direction of the magnetic moving body form a second bridge circuit.

A fixed voltage is impressed on the first bridge circuit, and resistance value changes of the magneto-resistance segments caused by changes in the magnetic field are converted into voltage changes. A resulting voltage-converted signal is amplified by an amplifier circuit and inputted to a first comparator circuit. A signal produced by the first comparator circuit comparing this with a predetermined voltage Vref1 is converted into a final output by an output circuit and is also inputted to a D terminal of a D flip-flop circuit. Similarly a fixed voltage is applied to the second bridge circuit and resistance value changes of those magneto-resistance segments caused by changes in the magnetic field are converted into voltage changes. The resulting voltage-converted signal is amplified by an amplifier circuit and inputted to a second comparator circuit. A signal produced by the second comparator circuit comparing this with a predetermined voltage Vref2 is inputted to a CL terminal of the D flip-flop circuit. The output signal of the D flip-flop circuit is converted by an output circuit into a rotation direction detection output.

Patent Document 1: JP-A-2002-90181 (paragraphs 0018 through 0029 and FIGS. 1 through 3).

The related art rotation detecting device has had the problem that, because it is constructed as described above, when deviations arise in the comparison level Vref1 of the first comparator circuit and the comparison level Vref2 of the second comparator circuit in the signal processing circuit part 3, or when deviations arise in the amplifier circuit outputs, it is not possible for rotation direction detection to be effected accurately.

SUMMARY OF THE INVENTION

It is therefore an object of the present invention to provide a rotation detecting device with which it is possible to make the phase difference between two signals used for detecting the rotation direction of a magnetic moving body ¼ of a period and it is possible to increase tolerance with respect to deviations in comparison levels of comparator circuits in a signal processing circuit part and deviations in the outputs of amplifier circuits and perform stable and certain operation.

To achieve this object and other objects, the invention provides a rotation detecting device of the kind having a magnetic moving body coupled to an object of detection, a magnet disposed facing this magnetic rotating body, and a magneto-electric converter device made up of a plurality of magneto-resistance segments disposed at a predetermined pitch in a rotation direction of the magnetic moving body, changes in impressed magnetic field strength accompanying rotation of the magnetic moving body being detected by the magneto-electric converter device to detect the rotation direction of the magnetic moving body. In this rotation detecting device provided by the invention, the magneto-electric converter device is made up of at least six segments disposed at a predetermined pitch in a predetermined rotation direction of the magnetic moving body, symmetrically about a centerline of the magnet perpendicular to the rotation direction of the magnetic moving body, and these include at least two pairs of segments having their pitch centers disposed symmetrically about the centerline of the magnet and forming first and second bridge circuits for producing outputs along with rotation of the magnetic moving body and at least one pair having its pitch center on the centerline of the magnet and forming a third bridge circuit for producing an output along with rotation of the magnetic moving body, and the rotation direction of the magnetic moving body is detected on the basis of a combination of these bridge circuit outputs.

With this invention it is possible to make the phase difference between two signals used for detecting the rotation direction of the magnetic moving body ¼ of a period, whereby tolerance with respect to deviations in comparison levels of comparator circuits and deviations in outputs of amplifier circuits can be increased and stable and certain operation performed.

DETAILED DESCRIPTION OF THE PREFERRED EMBODIMENTS

Figure 1A:
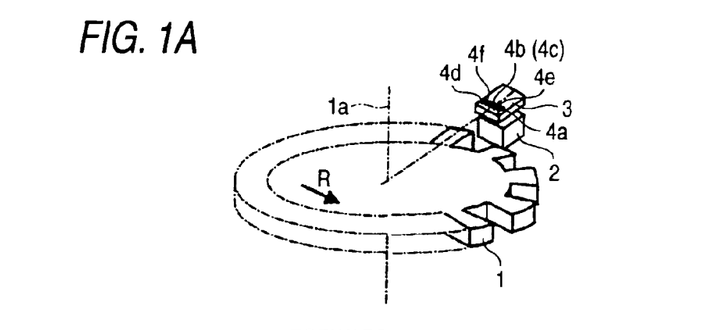
FIGS. 1A to 1C are views showing a magnetic circuit construction in Embodiment 1 of the invention.
Figure 1B:
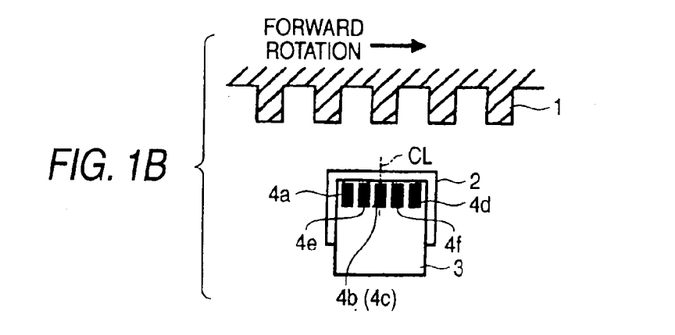
Figure 1C:
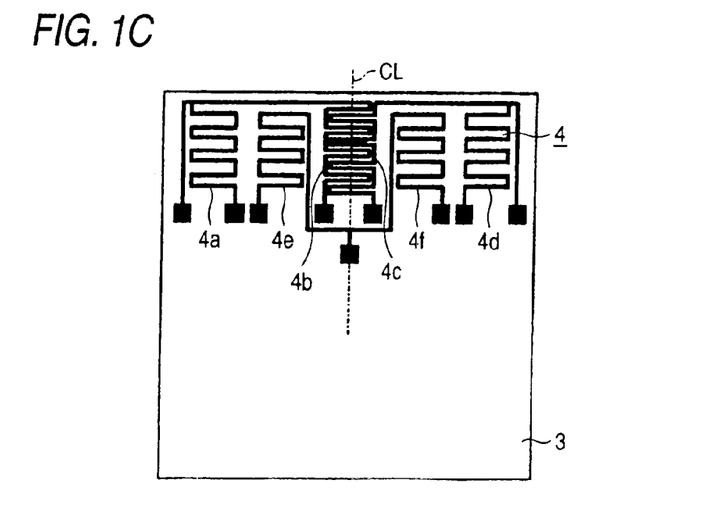
Figure 2:
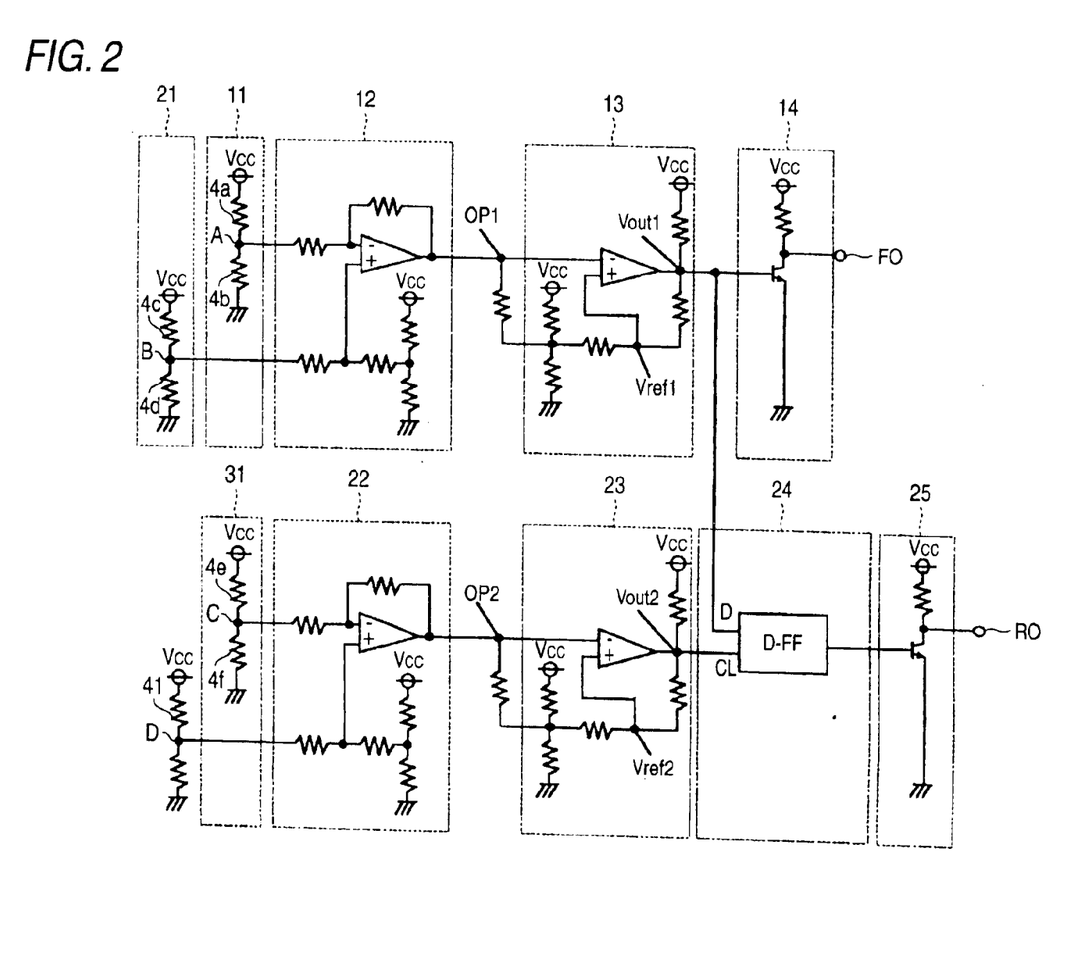
FIG. 2 is a circuit diagram of a signal processing circuit part in Embodiment 1.

Embodiment 1:

FIGS. 1A through 1C are construction views showing a rotation detecting device of Embodiment 1, FIG. 1A being a perspective view, FIG. 1B a plan view and FIG. 1C a pattern view of magneto-resistance segments. FIG. 2 is a circuit diagram of a signal processing circuit part.

This rotation detecting device has a cogwheel-like magnetic moving body 1 shaped to cause changes in a magnetic field; a magnet 2 disposed facing the magnetic moving body 1 and magnetized in the rotational axis direction 1a of the magnetic moving body 1; and a signal processing circuit part 3 on which is formed a magneto-electric converter device 4 made up of six magneto-resistance segments 4a through 4f at a predetermined pitch in the rotation direction of the magnetic moving body 1.

These six magneto-resistance segments 4a through 4f are formed by film formation on the signal processing circuit part 3, which consists of an IC chip, and are disposed in a predetermined rotation direction of the magnetic moving body 1, for example the forward direction shown by the arrow R, symmetrically about a centerline CL of the magnet 2 which is perpendicular to this rotation direction. Of these six, two magneto-resistance segments 4b and 4c are formed overlapping like comb teeth on the centerline CL of the magnet 2.

The two pairs of magneto-resistance segments 4a, 4b and 4c, 4d, whose pitch centers are positioned symmetrically with respect to the centerline CL of the magnet 2, form first and second bridge circuits 11, 21; and the remaining pair of magneto-resistance segments 4e, 4f, which has its pitch center on the centerline CL of the magnet 2, forms a third bridge circuit 31.

As shown in FIG. 2, a fixed voltage is impressed on the first bridge circuit 11 formed by the magneto-resistance segments 4a and 4b, and changes in the resistance values of the magneto-resistance segments caused by magnetic field changes are converted to voltage changes. Similarly, a fixed voltage is impressed on the second bridge circuit 21 formed by the magneto-resistance segments 4c, 4d, and changes in the resistance values of these magneto-resistance segments caused by magnetic field changes are converted into voltage changes. Resulting respective voltage-converted centerpoint outputs A and B are turned into a differential output and amplified by an amplifier circuit 12 and inputted to a comparator circuit 13. A signal produced by the comparator circuit 13 comparing this with a predetermined voltage Vref1 is converted by an output circuit 14 into a final output FO and also inputted to a D terminal of a D flip-flop circuit 24. The final output FO is used to detect an angular position such as a crank angle or a cam angle for engine control.

Similarly again, a fixed voltage is impressed on the third bridge circuit 31 formed by the magneto-resistance segments 4e and 4f, and changes in the resistance values of these magneto-resistance segments caused by magnetic field changes are converted into voltage changes. A resulting voltage-converted centerpoint output is outputted from an amplifier circuit 22 as a differential output respective to the output D of a voltage-dividing circuit 41 consisting of magneto-resistance segments or fixed resistances and inputted to a comparator circuit 23. A signal produced by the comparator circuit 23 comparing this with a predetermined voltage Vref2 is inputted to a CL terminal of the D flip-flop circuit 24. The output signal of the D flip-flop circuit 24 is converted by an output circuit 25 into a rotation direction detection output RO.

Figure 3A:
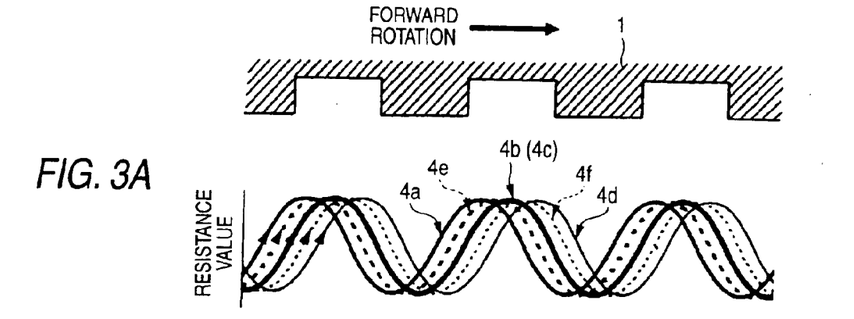
FIGS. 3A to 3F are signal waveforms chart pertaining to forward rotation in a normal state in Embodiment 1.
Figure 3B:
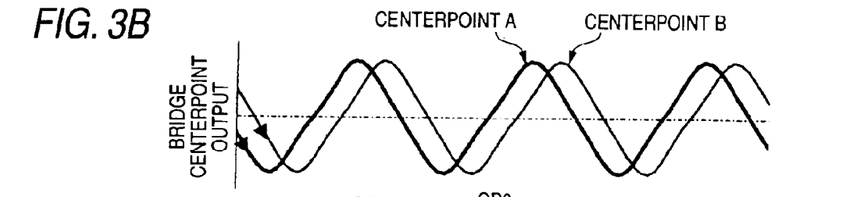
Figure 3C:
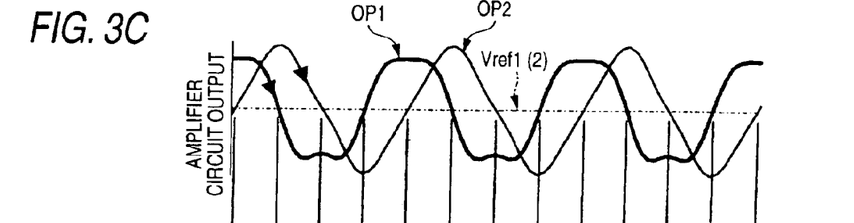
Figure 3D:
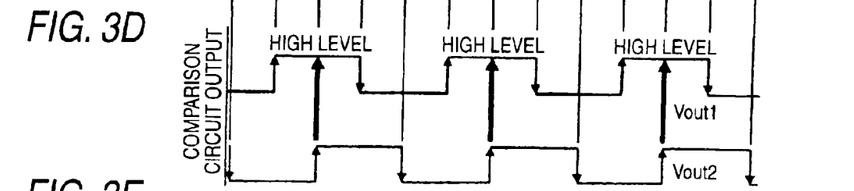
Figure 3E:
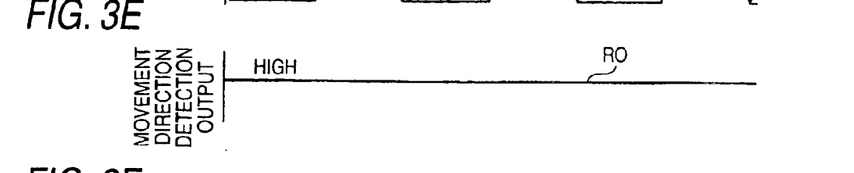
Figure 3F:
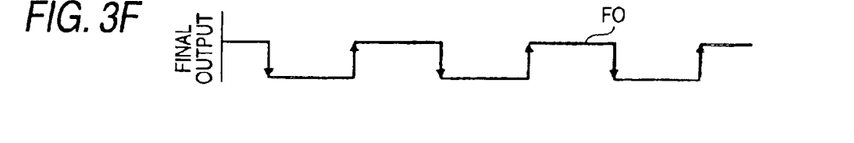
Figure 4A:
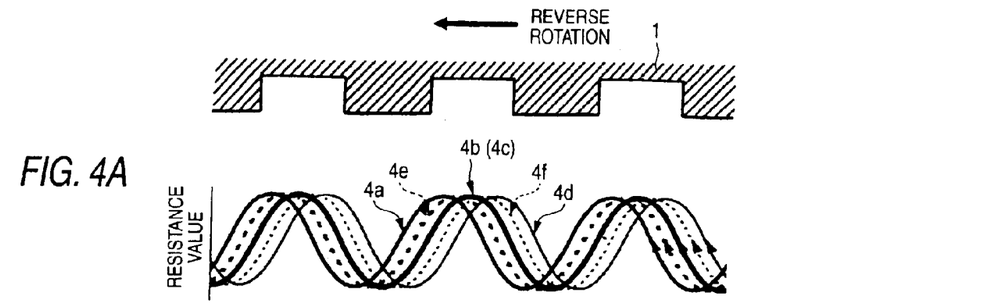
FIGS. 4A to 4F are signal waveforms chart pertaining to reverse rotation in the normal state in Embodiment 1.
Figure 4B:
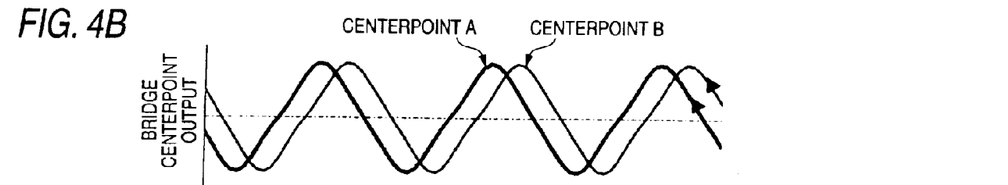
Figure 4C:
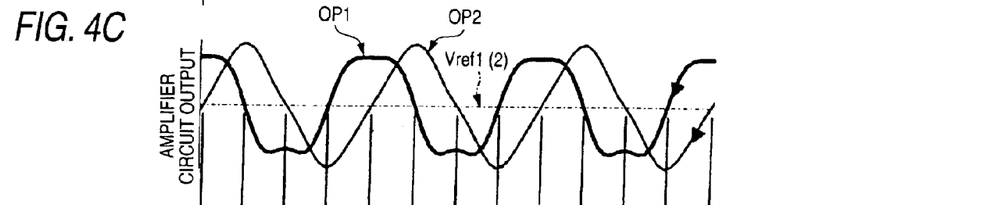
Figure 4D:
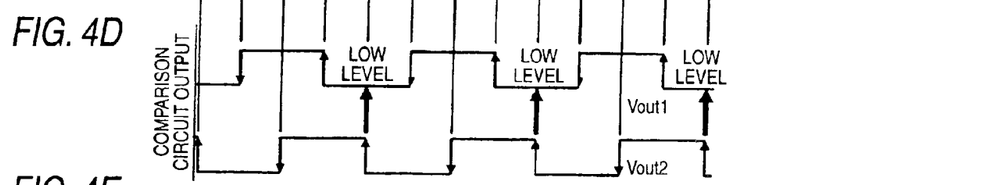
Figure 4E:
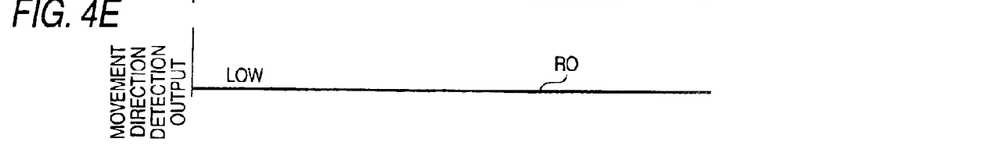
Figure 4F:
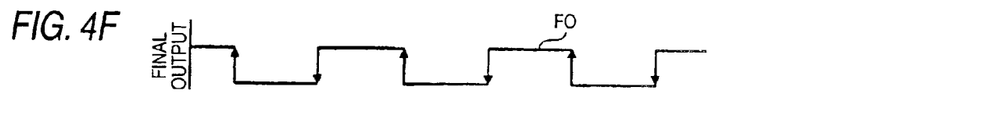
Figure 5A:
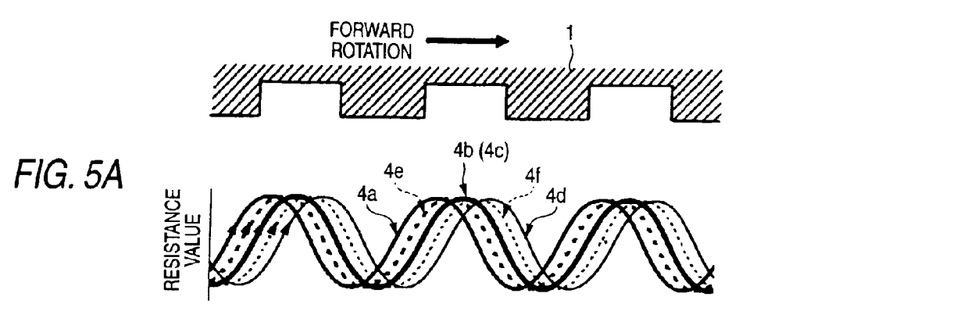
FIGS. 5A to 5F are signal waveforms chart pertaining to forward rotation when deviation has arisen in a comparison level in Embodiment 1.
Figure 5B:
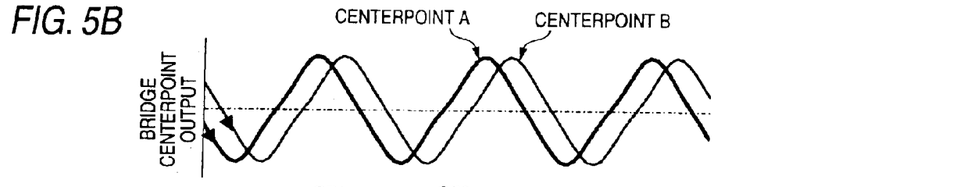
Figure 5C:
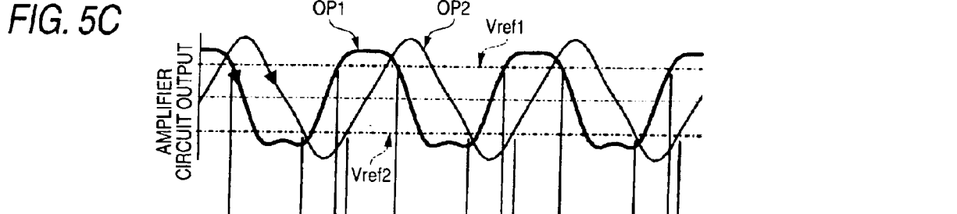
Figure 5D:
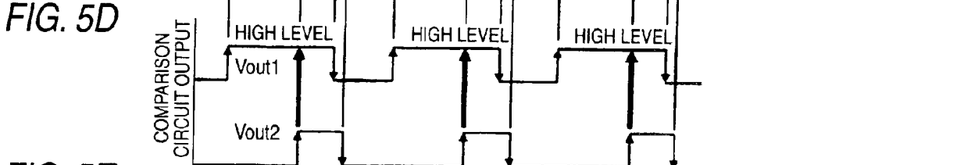
Figure 5E:
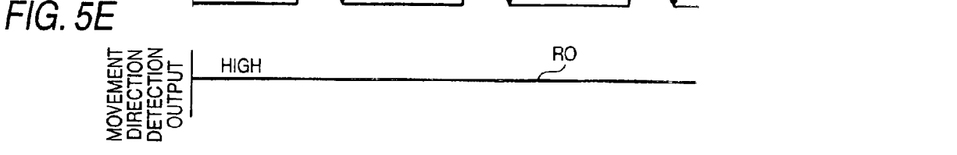
Figure 5F:
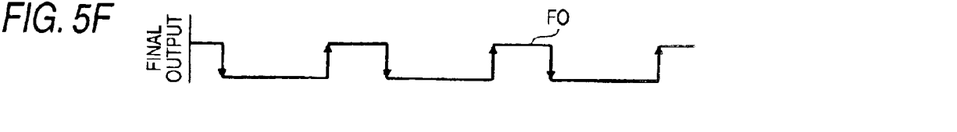
Figure 6A:
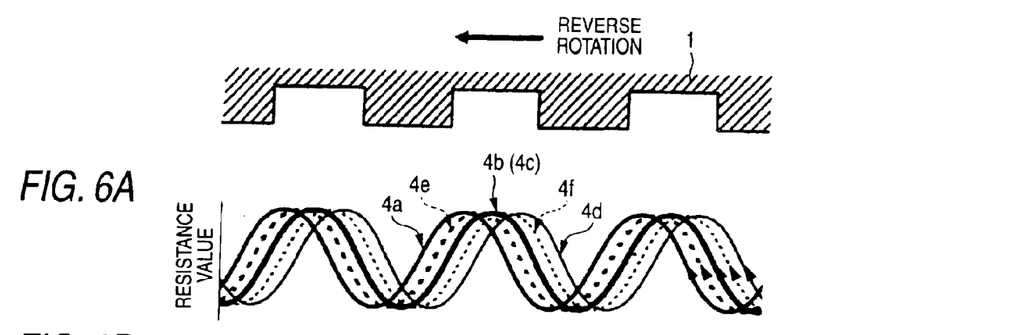
FIGS. 6A to 6F are signal waveforms chart pertaining to reverse rotation when deviation has arisen in a comparison level in Embodiment 1.
Figure 6B:
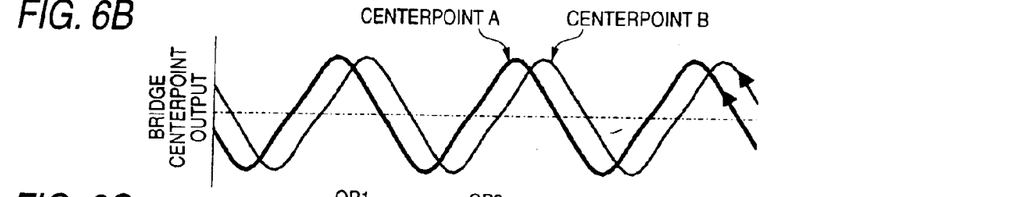
Figure 6C:
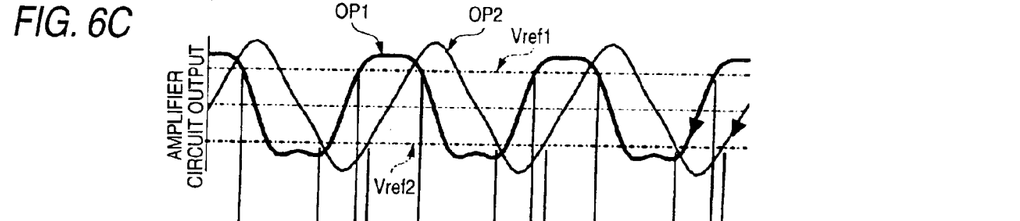
Figure 6D:
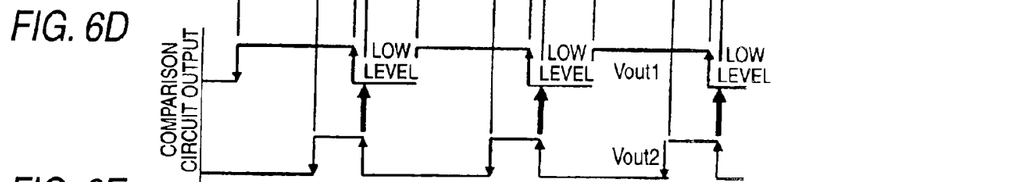
Figure 6E:
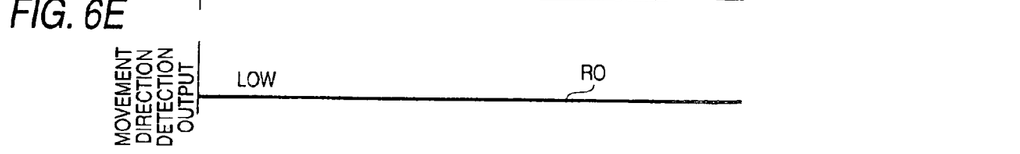
Figure 6F:
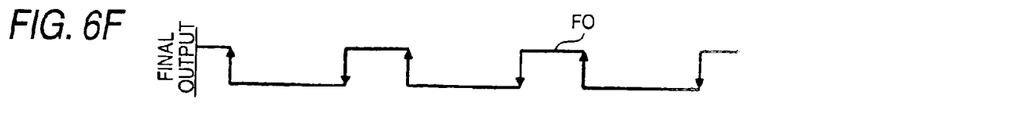

FIGS. 3 and 4 A through F are operation waveforms of the signal processing circuit part 3 during forward rotation and reverse rotation, respectively, of the magnetic moving body 1 in a normal state, FIGS. 3A and 4A showing the resistance values of the magneto-resistance segments 4a through 4f, FIGS. 3B and 4B showing the bridge centerpoint voltages A and B of the first and second bridge circuits 11 and 21, FIGS. 3C and 4C showing the outputs OP1, OP2 of the amplifier circuits 12 and 22, FIGS. 3D and 4D showing the outputs Vout1, Vout2 of the comparator circuits 13 and 23, FIGS. 3E and 4E showing the rotation direction detection output RO of the output circuit 25, and FIGS. 3F and 4F showing the final output FO of the output circuit 14.

And FIGS. 5 and 6 A through F are operation waveforms of the same parts of the signal processing circuit part 3 during forward rotation and reverse rotation, respectively, of the magnetic moving body 1 when deviation has arisen in the comparison level Vref1 of the comparator circuit 13 and the comparison level Vref2 of the comparator circuit 23, with FIGS. 5 and 6 A through F respectively corresponding to FIGS. 3 and 4 A through F.

As can be seen from these figures, in this preferred embodiment, because the phase difference between the signal Vout1 inputted to the D terminal of the D flip-flop circuit 24 and the signal Vout2 inputted to the CL terminal is being kept to ¼ of a period, even when deviation has arisen in the comparison levels Vref1 and Vref2 of the comparator circuits 13 and 23, the direction of rotation of the magnetic moving body 1 can still be detected.

Figure 7A:
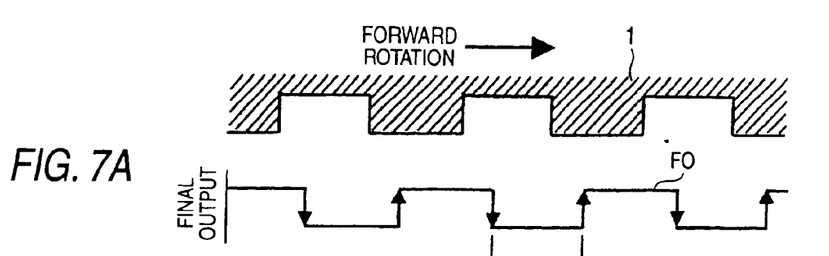
FIGS. 7A to 7D are signal waveforms chart showing for comparison between a related art case and the case of Embodiment 1 of the invention.
Figure 7B:
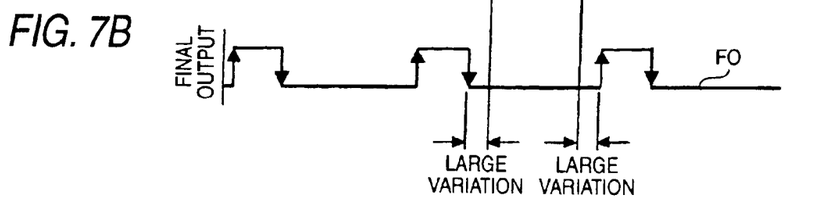
Figure 7C:
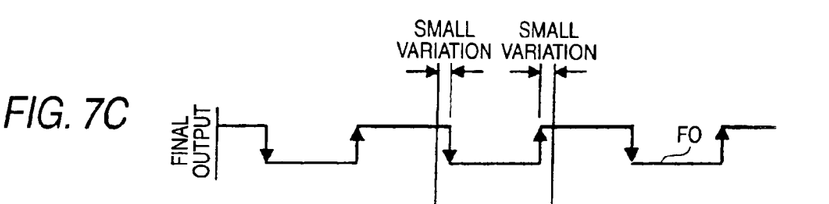
Figure 7D:
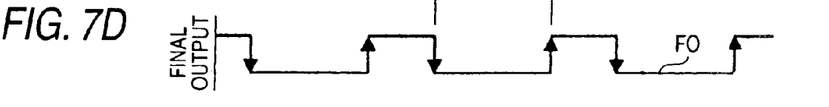

FIGS. 7A through 7D compare deviations in final output in a related art example and in Embodiment 1 when deviation has arisen in the comparison level Vref1 of the comparator circuit 13, FIGS. 7A and 7B respectively showing a case in which there is no deviation and a case in which there is deviation in the comparison level Vref1 of the comparator circuit 13 in the related art example, and FIGS. 7C and 7D respectively showing a case in which there is no deviation and a case in which there is deviation in the comparison level Vref1 of the comparator circuit 13 in Embodiment 1. As can be seen from these figures also, in Embodiment 1, deviation in the final output FO can be kept low.

Thus with a rotation detecting device according to this first preferred embodiment it is possible to keep the phase difference of the two signals used for detecting the rotation direction of the magnetic moving body 1 to ¼ of a period; tolerance with respect to deviations in the comparison levels Vref1, Vref2 of the comparator circuits 13, 23 in the signal processing circuit part 3 and deviations in the outputs of the amplifier circuits 12, 22 can be increased; and stable and certain operation can be performed.

As the magneto-electric convertor device 4 made up of the magneto-resistance segments 4a through 4f, it is also possible to use a giant magneto-resistance device (hereinafter, GMR).

Figure 8:
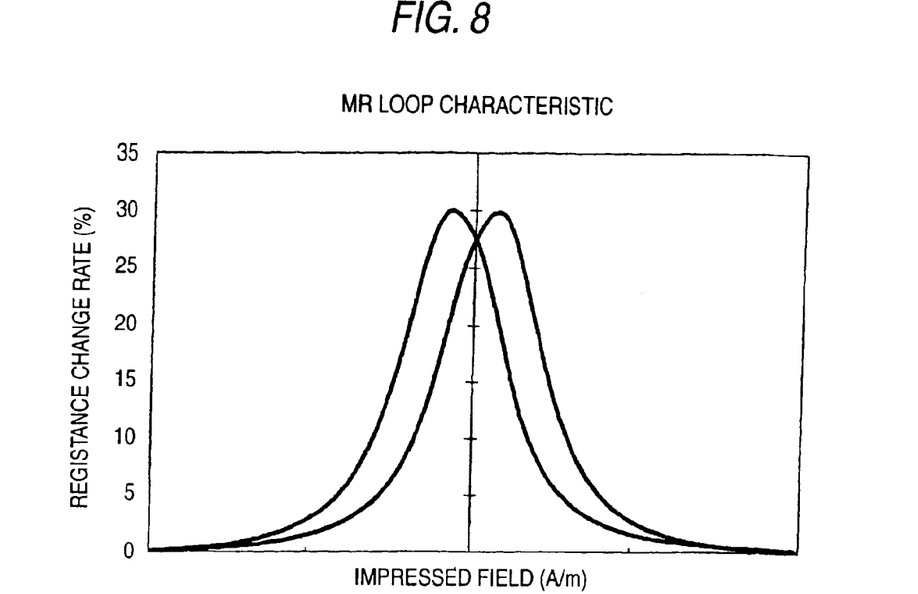
FIG. 8 is an MR loop characteristic of a GMR device.

A GMR device is a layered, so-called man-made lattice film made by alternately stacking magnetic layers and nonmagnetic layers of from a few Angstroms to several tens of Angstroms in thickness, for example (Fe/Cr)n, (permalloy/Cu/Co/Cu)n, (Co/Cu)n, and compared with a conventional magneto-resistance device (hereinafter, MR device) has a much larger MR effect (MR change rate), and, because it depends only on the relative angles of orientation of magnetization of adjacent magnetic layers, is an in-plane magnetic field sensor with which the same resistance value change is obtained whatever angle difference the orientation of the outside magnetic field has with respect to the current. (n is number of layers) However, it is also a device which can be given anisotropy by the width of the magnetic resistance pattern being made narrow. And it is a device having the characteristics that there is hysteresis in the resistance value changes caused by changes in the impressed magnetic field, and its temperature characteristic, and particularly its temperature coefficient, is large. The MR loop characteristic of a GMR device is shown in FIG. 8.

By using a GMR device for the magneto-electric converter device like this it is possible to raise the S/N ratio and increase noise tolerance.

Figure 9A:
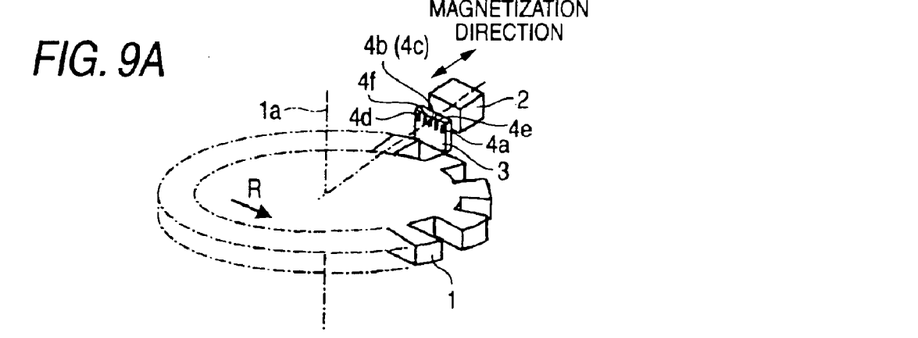
FIGS. 9A to 9C are views showing a magnetic circuit construction in Embodiment 2 of the invention.
Figure 9B:
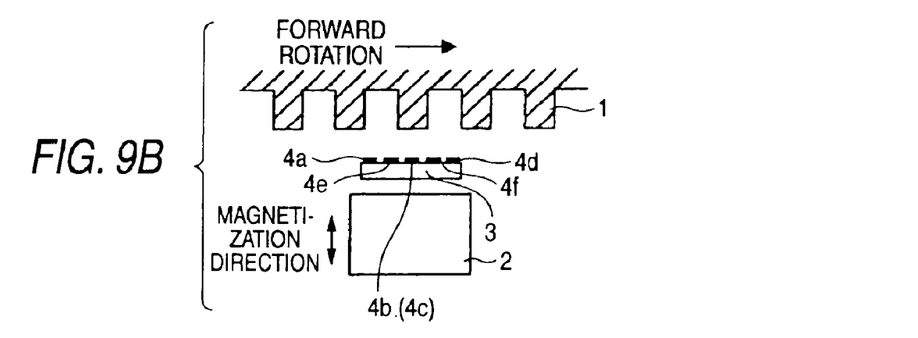
Figure 9C:
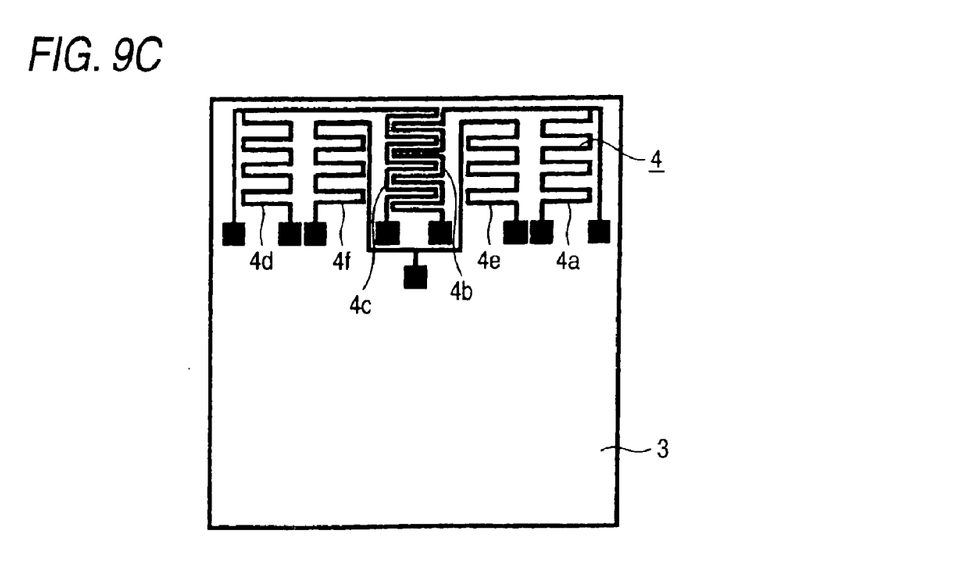

Embodiment 2:

FIG. 9 shows an example of another magnetic circuit construction which can be applied to this invention, in which a magnet 2 is disposed facing a magnetic moving body 1 with its magnetization direction made perpendicular to the rotational axis direction 1a of the magnetic moving body 1, and between the magnet 2 and the magnetic moving body 1 a magneto-electric converter device 4 made up of six magneto-resistance segments 4a through 4f is disposed perpendicular to the magnetization direction of the magnet 2. The pattern of the magneto-resistance segments 4a through 4f can be the same as in Embodiment 1.

With this second preferred embodiment also, the same effects as those of Embodiment 1 can be obtained.

Figure 10:
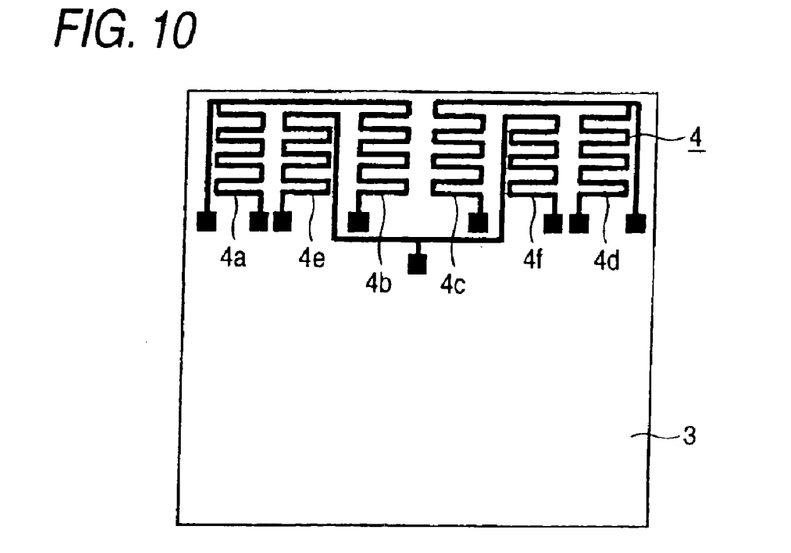
FIG. 10 is a plan view showing a pattern of magneto-resistance segments in Embodiment 3.

Embodiment 3:

FIG. 10 shows another example of a pattern of magneto-resistance segments which can be applied to the invention, in which a magneto-electric converter device 4 is made up of six magneto-resistance segments 4a through 4f formed at a predetermined pitch and of these magneto-resistance segments the first and third in a predetermined rotation direction of the magnetic moving body 1 form a first bridge circuit 11 and the fourth and sixth form a second bridge circuit 21 and the second and fifth form a third bridge circuit 31. In this way also, the same effects as those of Embodiment 1 can be obtained.

Figure 11:
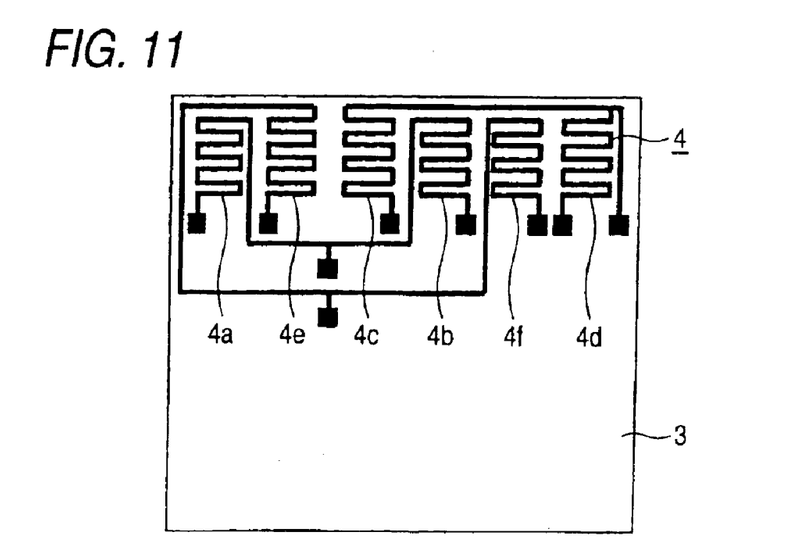
FIG. 11 is a plan view showing a pattern of magneto-resistance segments in Embodiment 4.

Embodiment 4:

FIG. 11 shows another example of a pattern of magneto-resistance segments which can be applied to the invention, in which a magneto-electric converter device 4 is made up of six magneto-resistance segments 4a through 4f formed at a predetermined pitch and of these magneto-resistance segments the first and fourth in a predetermined rotation direction of the magnetic moving body 1 form a first bridge circuit 11 and the third and sixth form a second bridge circuit 21 and the second and fifth form a third bridge circuit 31. In this way also, the same effects as those of Embodiment 1 can be obtained.

A rotation detecting device according to the present used in various applications, including engine

What is claimed is:

1. A rotation detecting device having a magnetic moving body coupled to an object of detection, a magnet disposed facing the magnetic moving body, and a magneto-electric converter device made up of a plurality of magneto-resistance segments disposed at a predetermined pitch in a rotation direction of the magnetic moving body, changes in impressed magnetic field strength accompanying rotation of the magnetic moving body being detected by the magneto-electric converter device to detect the rotation direction of the magnetic moving body, wherein the magneto-electric converter device comprises at least six segments disposed at a predetermined pitch in a predetermined rotation direction of the magnetic moving body symmetrically about a centerline of the magnet perpendicular to the rotation direction of the magnetic moving body and these include at least two pairs of segments having their pitch centers disposed symmetrically about the centerline of the magnet and forming first and second bridge circuits for producing outputs along with rotation of the magnetic moving body and at least one pair of segments having its pitch center on the centerline of the magnet and forming a third bridge circuit for producing an output along with rotation of the magnetic moving body, and the rotation direction of the magnetic moving body is detected on the basis of a combination of these bridge circuit outputs.

2. A rotation detecting device according to claim 1, comprising a signal processing circuit part for generating two signals having a phase difference of ¼ period on the basis of the differential output of the first and second bridge circuits and the output of the third bridge circuit and converting these signals into a rectangular wave signal by comparing them with a predetermined level.

3. A rotation detecting device according to claim 1, wherein a GMR device is used as the magneto-electric converter device.

4. A rotation detecting device according to claim 1, wherein the magneto-electric converter device comprises six magneto-resistance segments and of these two are formed nesting in the form of a toothcomb on the centerline of the magnet.

5. A rotation detecting device according to claim 1, wherein the magneto-electric converter device comprises six magneto-resistance segments formed at a predetermined pitch.

6. A rotation detecting device according to claim 4, wherein of the six magneto-resistance segments the first and third in a predetermined rotation direction of the magnetic moving body form the first bridge circuit and the fourth and sixth form the second bridge circuit and the second and fifth form the third bridge circuit.

7. A rotation detecting device according to claim 5, wherein of the six magneto-resistance segments the first and fourth in a predetermined rotation direction of the magnetic moving body form the first bridge circuit and the third and sixth form the second bridge circuit and the second and fifth form the third bridge circuit.

8. A rotation detecting device according to claim 1, wherein the magnet is disposed so as to made perpendicular its magnetization direction to the rotational axis direction of the magnetic moving body and the magneto-electric converter device is disposed between the magnet and the magnetic moving body so that the magneto-resistance segments are perpendicular to the magnetization direction of the magnet.

* * * * *